United States Patent
Choi et al.

(10) Patent No.: US 10,320,598 B2
(45) Date of Patent: Jun. 11, 2019

(54) DATA BLOCK TRANSMITTING METHOD AND TRANSMITTER

(71) Applicant: LG ELECTRONICS INC., Seoul (KR)

(72) Inventors: Jinsoo Choi, Seoul (KR); Wookbong Lee, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 122 days.

(21) Appl. No.: 15/509,832

(22) PCT Filed: Aug. 20, 2015

(86) PCT No.: PCT/KR2015/008714
§ 371 (c)(1),
(2) Date: Mar. 8, 2017

(87) PCT Pub. No.: WO2016/039535
PCT Pub. Date: Mar. 17, 2016

(65) Prior Publication Data
US 2017/0310519 A1    Oct. 26, 2017

Related U.S. Application Data (60) Provisional application No. 62/049,339, filed on Sep. 11, 2014.

(51) Int. Cl.
*H04L 27/26* (2006.01)
*H04L 27/18* (2006.01)
(Continued)

(52) U.S. Cl.
CPC .......... *H04L 27/2636* (2013.01); *H04L 27/18* (2013.01); *H04L 27/2602* (2013.01); *H04L 27/265* (2013.01); *H04L 27/2605* (2013.01); *H04L 27/2613* (2013.01); *H04L 5/0023* (2013.01); *H04L 5/0048* (2013.01); *H04W 84/12* (2013.01)

(58) Field of Classification Search
CPC . H04L 27/2636; H04L 27/18; H04L 27/2602; H04L 27/2605; H04L 27/2613; H04L 27/265; H04L 5/0023; H04L 5/0048; H04W 84/12
USPC ......................................... 370/310, 328, 338
See application file for complete search history.

(56) References Cited

U.S. PATENT DOCUMENTS

2010/0260159 A1    10/2010  Zhang et al.
2013/0128807 A1*    5/2013  Vermani ............... H04L 5/0053
                                                                 370/328

(Continued)

OTHER PUBLICATIONS

PCT International Application No. PCT/KR2015/008714, International Search Report dated Nov. 30, 2015, 4 pages.

*Primary Examiner* — Obaidul Huq
(74) *Attorney, Agent, or Firm* — Lee Hong Degerman Kang & Waimey (57) ABSTRACT

A method of transmitting a data block in a wireless WLAN and a device using the same are provided. A transmitter transmits a physical layer protocol data unit (PPDU) that includes a legacy-signal (L-SIG). A guard period (GI) of a first orthogonal frequency division multiplexing (OFDM) symbol that follows the L-SIG is shorter than the GI of a second OFDM symbol that follows the first OFDM symbol.

6 Claims, 5 Drawing Sheets

(51) Int. Cl.
*H04W 84/12* (2009.01)
*H04L 5/00* (2006.01)

(56) References Cited

U.S. PATENT DOCUMENTS

| | | |
|---|---|---|
| 2013/0286938 A1 | 10/2013 | Porat |
| 2014/0029681 A1 | 1/2014 | Zhang et al. |
| 2014/0211775 A1 | 7/2014 | Sampath et al. |
| 2014/0229808 A1 | 8/2014 | Van Nee et al. |
| 2015/0117227 A1* | 4/2015 | Zhang .................. H04L 1/0057 370/245 |

* cited by examiner

DATA BLOCK TRANSMITTING METHOD AND TRANSMITTER

CROSS-REFERENCE TO RELATED APPLICATIONS

This application is the National Stage filing under 35 U.S.C. 371 of International Application No. PCT/KR2015/008714, filed on Aug. 20, 2015, which claims the benefit of U.S. Provisional Application No. 62/049,339, filed on Sep. 11, 2014, the contents of which are all hereby incorporated by reference herein in their entirety.

BACKGROUND OF THE INVENTION

Field of the Invention

The present specification relates to wireless communication, and more particularly, to a method for transmitting a data block in a wireless local area network (WLAN), and a transmitter using the method.

Related Art

The Wi-Fi is a Wireless Local Area Network (WLAN) technology that enables a device to be connected to the Internet in a frequency band of 2.4 GHz, 5 GHz or 60 GHz. A WLAN is based on Institute of Electrical and Electronics Engineers (IEEE) 802.11 standard.

The IEEE 802.11n standard supports multiple antennas and provides a maximum data rate of 600 Mbits/s. A system that supports the IEEE 802.11n standard is called a High Throughput (HT) system.

The IEEE 802.11ac standard mostly operates in a 5 GHz band and provides a data rate of 1 Gbit/s or more. IEEE 802.11ac supports downlink Multi-User Multiple Input Multiple Output (MU-MIMO). A system that supports IEEE 802.11ac is called a Very High Throughput (VHT) system.

A IEEE 802.11ax is being developed as a next-generation WLAN for handling a higher data rate and a higher user load. The scope of IEEE 802.11ax may include 1) the improvements of the 802.11 physical (PHY) layer and the Medium Access Control (MAC) layer, 2) the improvements of spectrum efficiency and area throughput, 3) performance improvement in an environment under an interference source, a crowded heterogeneous network environment, and an environment having heavy user load.

A physical layer protocol data unit (PPDU) is a data block generated in a physical (PHY) layer according to the IEEE 802.11 standard. A WLAN of various versions such as IEEE 802.11n and IEEE 802.11ac uses PPDUs of different formats. To enhance compatibility of a terminal, a PPDU format is defined to be detected at a PHY level. That is, a terminal supporting only the IEEE 802.11n cannot detect a PPDU of an the 802.11ac format. A terminal supporting both the IEEE 802.11n and the IEEE 802.11ac can know from the PPDU format whether a corresponding PPDU is for the IEEE 802.11n or the IEEE 802.11ac.

With the introduction of a new IEEE 802.11ax, there is a need for a method capable of automatically detecting PPDUs of existing and new formats.

SUMMARY OF THE INVENTION

The present specification provides a method of transmitting a data block in a wireless local area network and a device using the method.

In an aspect, a method for transmitting a data block in a wireless local area network includes generating, by a transmitter, a physical layer protocol data unit (PPDU) comprising a legacy-signal (L-SIG), and transmitting, by the transmitter, the PPDU to a receiver. A guard period (GI) of a first orthogonal frequency division multiplexing (OFDM) symbol subsequent to the L-SIG is shorter than a GI of a second OFDM symbol subsequent to the first OFDM symbol.

The first and second OFDM symbols may be used in transmission of a signal field having control information which is specific to the receiver.

The L-SIG, the first OFDM symbol, and the second OFDM symbol may use the same modulation scheme. Wherein The PPDU further may comprise a high efficiency-short training field (HE-STF), and a fast Fourier transform (FFT) size of the L-SIG may be different from an FFT size of the HE-STF.

In another aspect, a transmitter in a wireless local area network includes a data generator for generating a physical layer protocol data unit (PPDU) comprising a legacy-signal (L-SIG), and a data transmitter for transmitting the PPDU to a receiver. A guard period (GI) of a first orthogonal frequency division multiplexing (OFDM) symbol subsequent to the L-SIG is shorter than a GI of a second OFDM symbol subsequent to the first OFDM symbol.

A format of a corresponding data block can be detected in a situation where data blocks of various formats co-exist.

DESCRIPTION OF EXEMPLARY EMBODIMENTS

For clarity, a Wireless Local Area Network (WLAN) system in accordance with the Institute of Electrical and Electronics Engineers (IEEE) 802.11n standard is called a High Throughput (HT) system, and a system in accordance with the IEEE 802.11ac standard is called a Very High Throughput (VHT) system. A WLAN system in accordance with proposed methods is called a High Efficiency WLAN (HEW) system or a High Efficiency (HE) system. The term "HEW" or "HE" is used to distinguish it from a conventional WLAN, and any restriction is not imposed on the term.

A proposed WLAN system may operate in a frequency band of 6 GHz or less or a frequency band of 60 GHz. The frequency band of 6 GHz or less may include at least one of a 2.4 GHz band and a 5 GHz band.

A station (STA) may be called various names, such as a wireless device, a Mobile Station (MS), a network interface device, and a wireless interface device. An STA may include a non-AP STA or an Access Point (AP) unless the function of the STA is separately distinguished from that of an AP. When it is said that communication is performed between an STA and an AP, the STA may be construed as being a non-AP STA. When it is said that communication is performed between an STA and an AP or the function of an AP is not separately required, an STA may be a non-AP STA or an AP.

A Physical layer Protocol Data Unit (PPDU) is a data block that is generated in the physical (PHY) layer in IEEE 802.11 standard.

Figure 1:
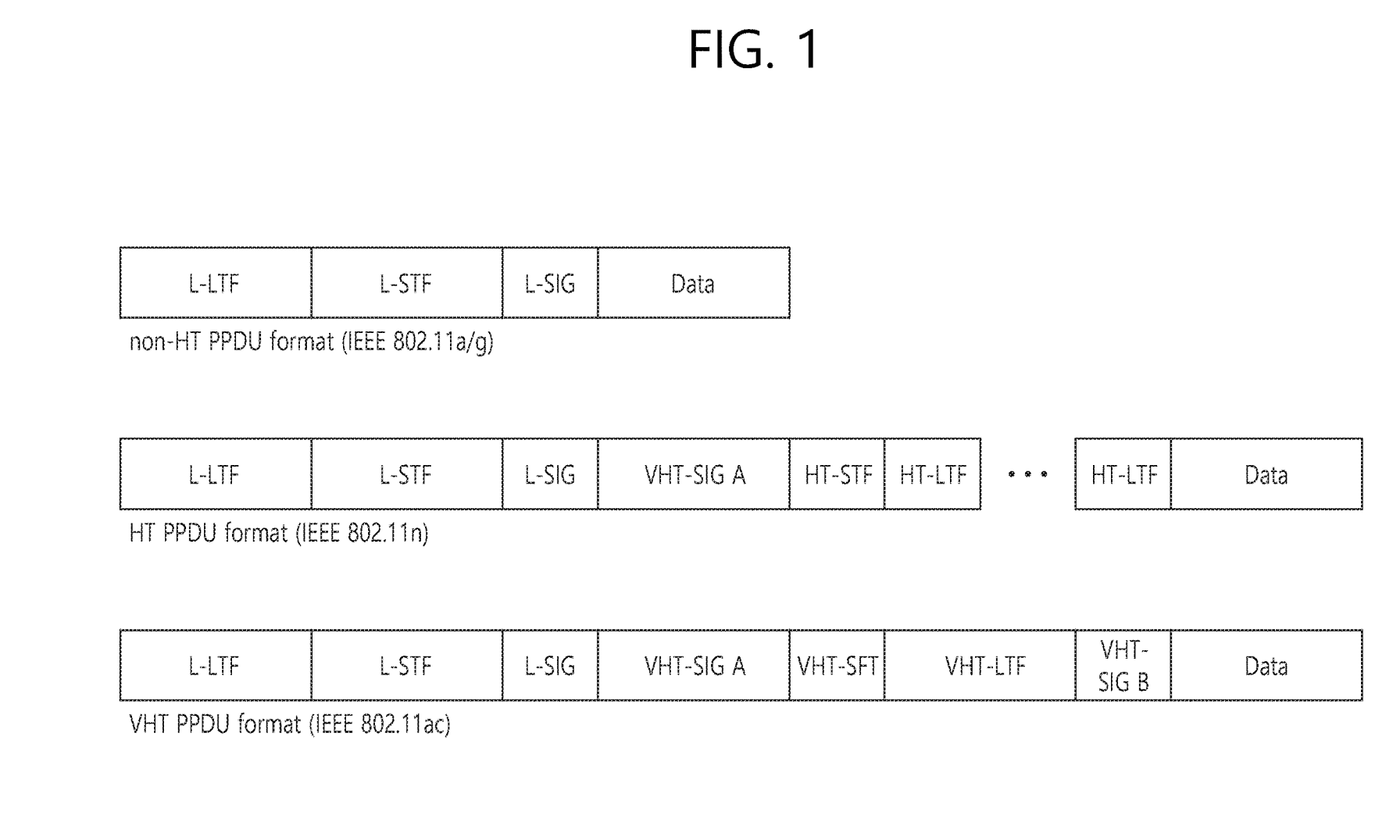
FIG. 1 shows a physical layer protocol data unit (PPDU) format according to the conventional technique.

FIG. 1 illustrates a conventional PPDU format.

A PPDU supporting IEEE 802.11a/g includes a Legacy-Short Training Field (L-STF), a Legacy-Long Training Field (L-LTF), and a legacy-signal (L-SIG). The L-STF may be used for frame detection, Automatic Gain Control (AGC), etc. The L-LTF may be used for fine frequency/time synchronization and channel estimation.

An HT PPDU supporting IEEE 802.11n includes a VHT-SIG, an HT-STF, and HT-LTFs which are sequentially subsequent to an L-SIG.

A VHT PPDU supporting IEEE 802.11ac includes a VHT-SIG A, a VHT-STF, a VHT-LTF, and a VHT-SIG B which are sequentially subsequent to an L-SIG.

Figure 2:
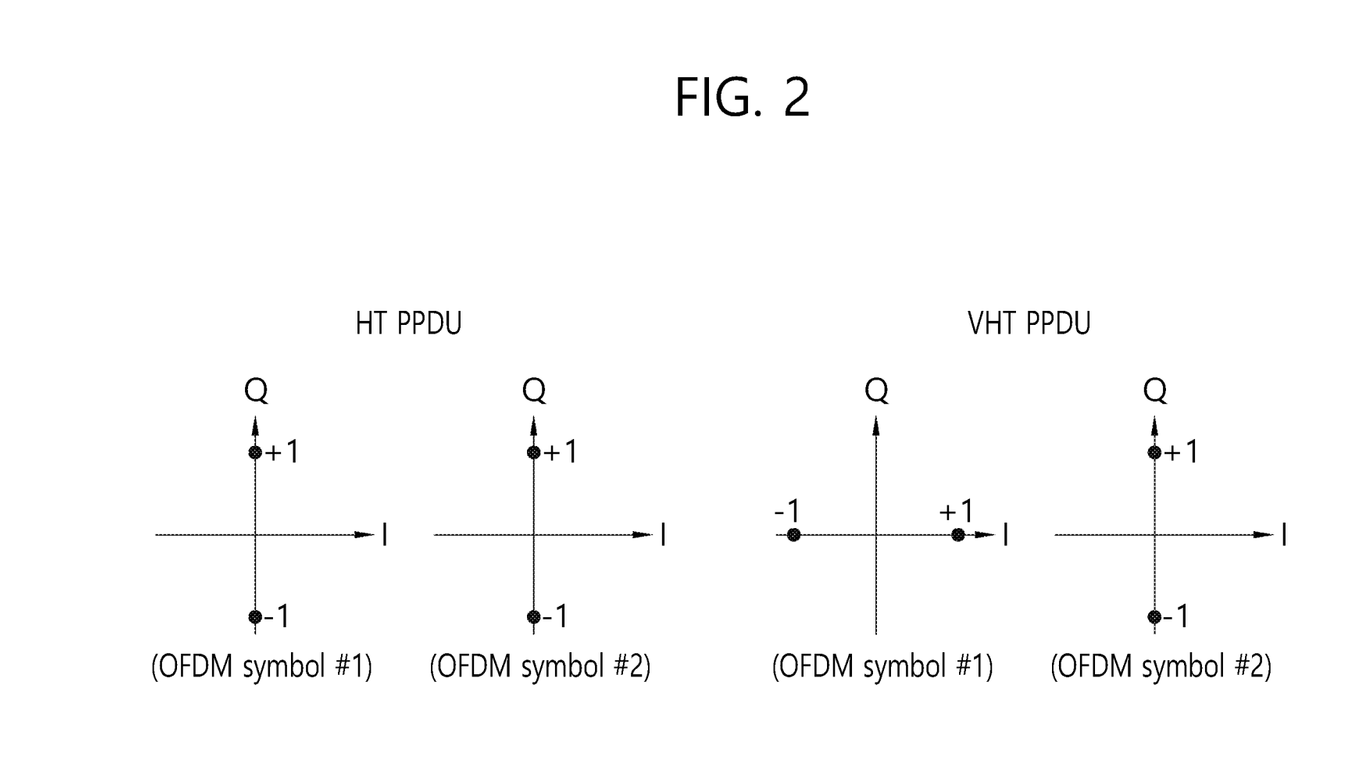
FIG. 2 shows a method for identifying a PPDU format according to the conventional technique.

FIG. 2 shows a method for identifying a PPDU format according to the conventional technique.

To identify the PPDU format, a phase of a constellation is used for orthogonal frequency division multiplexing (OFDM) symbols transmitted after an L-STF, an L-LTF, and an L-SIG. An OFDM symbol#1 is a first OFDM symbol which comes after the L-SIG, and an OFDM symbol#2 is an OFDM symbol subsequent to the OFDM symbol#1.

The L-SIG may use binary phase shift keying (BPSK) as a modulation scheme. In a non-HT PPDU, the modulation scheme used in the OFDM symbols#1 and the OFDM symbol#2 is the same as that used in the L-SIG. That is, the BPSK is used in the OFDM symbol#1 and the OFDM symbol#2.

In an HT PPDU, constellations used in the OFDM symbol#1 and the OFDM symbol#2 have the same phase, and the phase rotates by 90 degrees in a counterclockwise. A modulation scheme having a constellation rotated by 90 degrees is called quadrature binary phase shift keying (QBPSK).

In a VHT PPDU, a phase in the OFDM symbol#1 does not rotate, whereas a phase in the OFDM symbol#2 rotates by 90 degrees in the counterclockwise in the same manner as in the HT PPDU. A VHT-SIGA is transmitted after the L-SIG, and the VHT-SIGA is transmitted on 2 OFDM symbols. Thus, the OFDM symbol#1 and the OFDM symbol#2 are used in the transmission of the VHT-SIGA.

The following table shows a modulation scheme according to the PPDU format.

TABLE 1

| PPDU format | L-SIG | OFDM symbol#1 | OFDM symbol#2 |
|---|---|---|---|
| non-HT PPDU | BPSK | BPSK | BPSK |
| HT PPDU | BPSK | QBPSK | QBPSK |
| VHT PPDU | BPSK | BPSK | QBPSK |

A wireless device detects a constellation on 2 OFDM symbols after the L-SIG, and thus may know a format of a corresponding PPDU.

Figure 3:
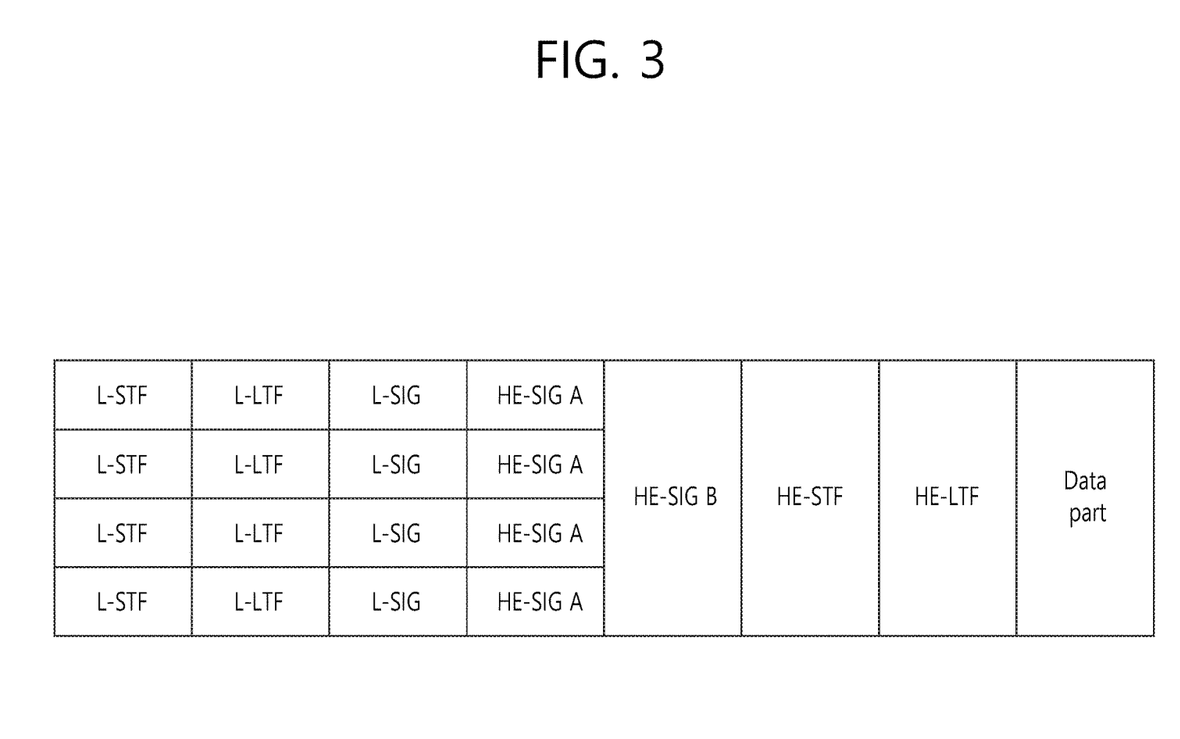
FIG. 3 shows an example of a PPDU format for the proposed wireless local area network (WLAN).

FIG. 3 shows an example of a PPDU format for the proposed WLAN.

It shows a PPDU transmitted at a total of 80 MHz bandwidth through four 20 MHz channels. The PPDU may be transmitted through at least one 20 MHz channel. Herein, it is shown an example in which an 80 MHz band is allocated to one receiving STA. Each of the 20 MHz channels may be allocated to a different receiving STA.

An L-STF and an L-LTF may be the same as those of a non-HT/HT/VHT PPDU. The L-SIG indicates a length of the PPDU (or a transmission time of the PPDU).

An HE-SIGA may include common control information commonly received by the STA for receiving the PPDU. The HE-SIGA may be transmitted on two or three OFDM symbols.

The following table shows an example of information included in the HE-SIGA. A field name or the number of bits are exemplary purposes only, and thus not all fields are necessary.

TABLE 2

| Field | Bit | Description |
|---|---|---|
| Bandwidth | 2 | A bandwidth on which a PPDU is transmitted. For example, 20 MHz, 40 MHz, 80 MHz, or 160 MHz |
| Group ID | 6 | Indicate an STA or STA group for receiving a PPDU. |
| Stream information | 12 | Indicate a position or the number of spatial streams to be received by an STA. Or, indicate a position or the number of spatial streams to be received by each STA in an STA group. |
| UL(uplink) indication | 1 | Indicate whether a PPDU is for an AP (uplink) or an STA (downlink). |
| MU indication | 1 | Indicate whether it is an SU-MIMO PPDU or an MU-MIMO PPDU. |
| GI(Guard interval) indication | 1 | Indicate whether a short GI or a long GI is used. |
| Allocation information | 12 | A bandwidth or channel (subchannel index or subband index) allocated to each STA on a bandwidth on which the PPDU is transmitted. |
| Transmit power | 12 | Transmit power for each allocated channel |

An HE-SIGB may contain user-specific information required by each STA to receive its data (i.e., physical layer service data unit (PSDU)). The HE-SIGB may be transmitted on one or two OFDM symbols. For example, the HE-SIGB may include information regarding a length of a corresponding PSDU and a modulation and coding scheme (MCS) of the corresponding PSDU. A position of the HE-SIGB may be changed. For example, the HE-SIGB may be disposed after HT-LTF.

An HE-STF may be used to improve AGC estimation in MIMO transmission. The HE-LTF may be used to estimate a MIMO channel. A data part may include a physical layer service data unit (PSDU) for a corresponding STA.

The PPDU may be divided into two parts. A first part may include at least one of the L-STF, the L-LTF, the L-SIG, and the HE-SIGA. A second part may include at least one of the HE-SIGB, the HT-STF, the HT-LTF, and the data part.

The first part may be transmitted duplicately in unit of 20 MHz channel. That is, when the PPDU is transmitted on four 20 MHz channels, the first part is transmitted duplicately for each 20 MHz channel.

The first part and the second part have different fast Fourier transform (FFT) sizes. The FFT size of the second part may be K times (where K is an integer with K>1) the FFT size of the first part. When K=4, the FFT size of the first part and the second part according to a transmission bandwidth may be as follows.

TABLE 3

| Transmission bandwidth | 20 MHz | 40 MHz | 80 MHz | 160 MHz |
|---|---|---|---|---|
| FFT size of first part | 64 | 128 | 256 | 512 |
| FFT size of second part | 256 | 512 | 1024 | 2048 |

When the FFT size increases, an OFDM subcarrier spacing decreases and the number of OFDM subcarriers per unit frequency increases, whereas an OFDM symbol time may increase. By allowing a guard interval (GI) of the second part to be greater than a GI of the first part, inter-symbol interference (ISI) can be reduced in an outdoor environment.

Figure 4:
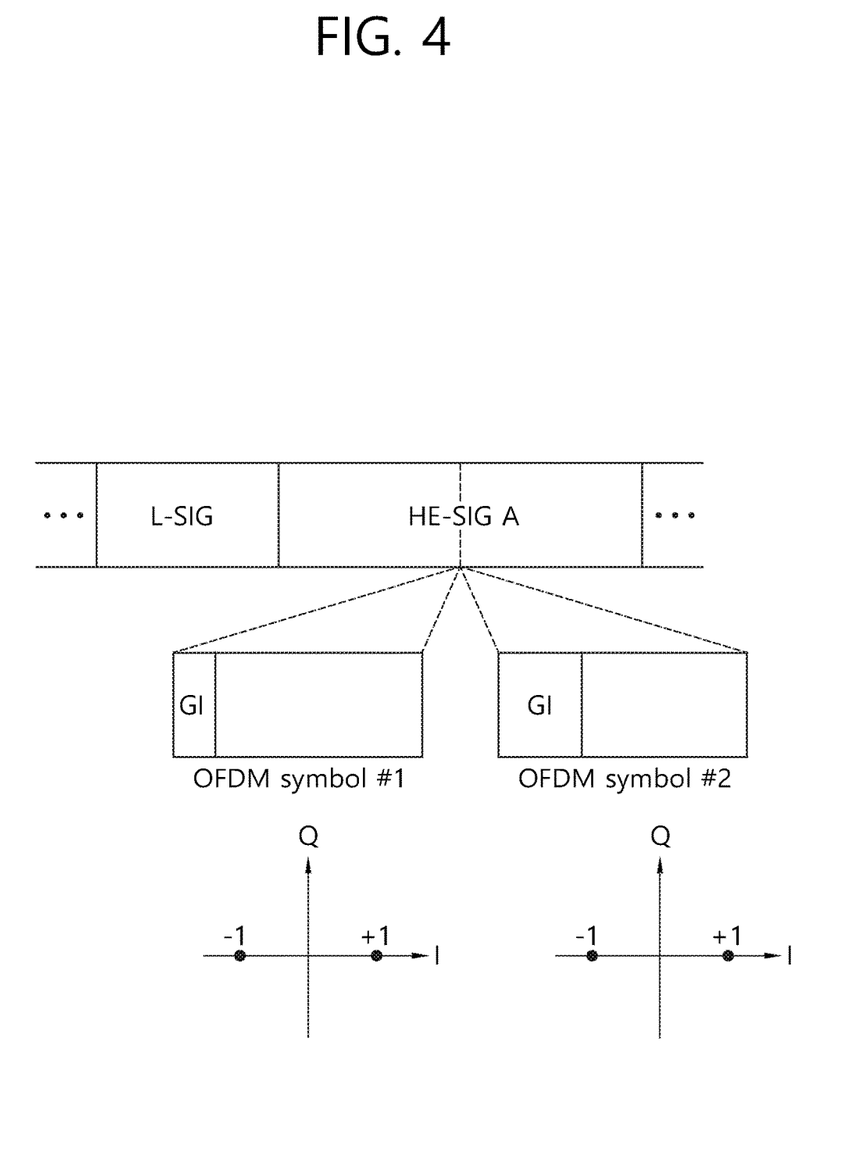
FIG. 4 shows a configuration of a PPDU according to an embodiment of the present invention.

FIG. 4 shows a configuration of a PPDU according to an embodiment of the present invention.

Proposed are a constellation and GI configuration for distinguishing the proposed PPDU from the existing non-HT/HT/VHT PPDU.

An OFDM symbol#1 is a first OFDM symbol which comes after an L-SIG, and an OFDM symbol#2 is an OFDM symbol subsequent to the OFDM symbol #1. When it is assumed that an HE-SIGA is transmitted on at least two OFDM symbols, it can be said that the OFDM symbol#1 and the OFDM symbol#2 are used for transmission of the HE-SIGA.

In the proposed PPDU format, the OFDM symbol#1 and the OFDM symbol#2 have GIs having different lengths. More specifically, the GI of the OFDM symbol#2 may have a length M times (M>1) longer than the GI of OFDM symbol#1. For example, the OFDM symbol #1 may have a GI of 0.8 microseconds, which is the same as the GI of a non-HT/HT/VHT PPDU, and the OFDM symbol #2 may have a GI of 1.6 microseconds, 2.4 microseconds, or 3.2 microseconds. The GI of the OFDM symbol #1 may have the same length as the GI of the OFDM symbol used for transmission of the L-SIG.

A receiving STA may perform detection in accordance with a symbol boundary of the OFDM symbol#1 in the same manner as the existing non-HT/HT/VHT PPDU. In addition, in the OFDM symbol#2, detection performance may be improved in an outdoor environment due to the increased GI. Since the HE-SIGA transmitted through the OFDM symbol#1 and the OFDM symbol#2 is decoded based on one cyclic redundancy check (CRC), decoding performance may be better than a case of applying the same GI as the GI of the non-HT/HT/VHT PPDU to the OFDM symbol#1 and the OFDM symbol#2.

In the OFDM symbol#1 and the OFDM symbol#2, a modulation scheme of BPSK may be applied in the same manner as the L-SIG. Accordingly, a format of the proposed PPDU may be distinguished at a modulation level at least from the HT/VHT PPDU.

Figure 5:
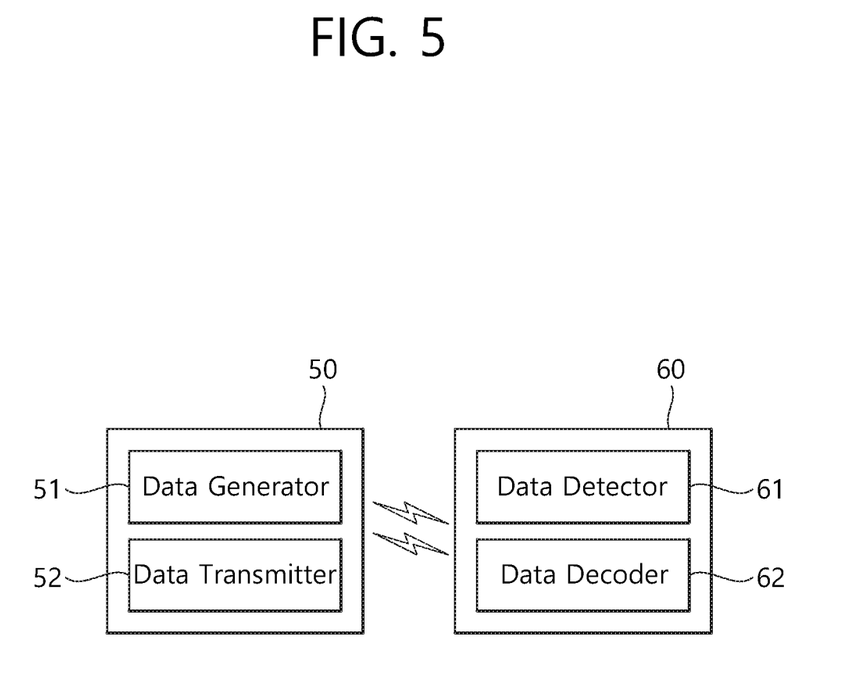
FIG. 5 is a block diagram showing a transmitter and a receiver according to an embodiment of the present invention.

FIG. 5 is a block diagram showing a transmitter and a receiver according to an embodiment of the present invention.

A transmitter 50 includes a data generator 51 and a data transmitter 52. The data generator 51 and the data transmitter 52 may be implemented by a processor. The data generator 51 may generate a PPDU according to the aforementioned embodiment. The data transmitter 52 transmits the generated PPDU on a radio channel.

A receiver 60 may include a data detector 61 and a data decoder 62. The data detector 61 and the data decoder 62 may be implemented by a processor. The data detector 610 may detect a format of a received PPDU. The data detector 610 may determine whether the received PPDU has a proposed PPDU format or a non-HT/HT/VHT PPDU format. If the format of the received PPDU is decodable, the data decoder 62 decodes the received PPDU.

A processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices.

The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a data block in a wireless local area network, the method comprising:

generating, by a first station (STA), a physical layer protocol data unit (PPDU) including a first field and a second field subsequent to the first field, wherein a first Fast Fourier Transform (FFT) value applied to the first field is smaller than a second FFT value applied to the second field, wherein the second field includes a first orthogonal frequency division multiplexing (OFDM) symbol and a second OFDM symbol subsequent to the first OFDM symbol, wherein a binary phase shift keying (BPSK) modulation scheme is used for the first field, the first OFDM symbol and the second OFDM symbol, and wherein a first guard interval (GI) of the first OFDM symbol is shorter than a second GI of a second OFDM symbol; and transmitting, by the first STA, the PPDU to a second STA.

2. The method of claim 1, wherein the PPDU further comprises a high efficiency-short training field (HE-STF), and wherein the second FFT value is applied to the HE-STF.

3. The method of claim 2, wherein the second FFT value is K times (K>1) greater than the first FFT value.

4. The method of claim 1, wherein the second GI of the second OFDM symbol is M times (M>1) longer than the first GI of the first OFDM symbol.

5. A first station (STA) in a wireless local area network, the first STA comprising:

a data generator for generating a physical layer protocol data unit (PPDU) including a first field and a second field subsequent to the first field, wherein a first Fast Fourier Transform (FFT) value applied to the first field is smaller than a second FFT value applied to the second field, wherein the second field includes a first orthogonal frequency division multiplexing (OFDM) symbol and a second OFDM symbol subsequent to the first OFDM symbol, wherein a binary phase shift keying (BPSK) modulation scheme is used for the first field, the first OFDM symbol and the second OFDM symbol, and wherein a first guard interval (GI) of the first OFDM symbol is shorter than a second GI of a second OFDM symbol; and a data transmitter for transmitting the PPDU to a second STA.

6. The transmitter first STA of claim 5,
wherein the PPDU further comprises a high efficiency-short training field (HE-STF), and
wherein the second FFT value is applied to the HE-STF.

\* \* \* \* \*